J. H. LAMENT.
Device for Attaching Pulleys to Shafts.

No. 211,411. Patented Jan. 14, 1879.

Witnesses:
M. Georgis
Henry R. Elliott

Jas. H. Lament
Inventor:
by atty M. Bailey

UNITED STATES PATENT OFFICE.

JAMES H. LA MENT, OF TROY, PENNSYLVANIA.

IMPROVEMENT IN DEVICES FOR ATTACHING PULLEYS TO SHAFTS.

Specification forming part of Letters Patent No. 211,411, dated January 14, 1879; application filed December 11, 1878.

*To all whom it may concern:*

Be it known that I, JAMES H. LA MENT, of Troy, in the county of Bradford and State of Pennsylvania, have invented certain new and useful Improvements in Devices for Attaching Wheels or Pulleys to Shafts, of which the following is a specification:

My invention, while adapted for use generally to shafts with which driving-wheels or pulleys are to be so combined as to rotate said shaft in one direction only, is directed particularly to the combination of these parts in sewing-machines where it is desirable at times—as, for instance, in bobbin-winding—to put in motion the driving mechanism while the stitch-forming devices remain at rest. This, I am aware, has before been done; and my invention consists in the employment for the purpose of certain mechanical devices, which are simple, cheap, easy of application to existing forms of sewing-machines, and yet perfectly effective in operation.

I mount the fly or driving wheel loosely on the shaft that drives the needle bar or rod, and I connect the two by a spring-pawl on the one that engages a face-ratchet on the other, the pawl being maintained in engagement with the ratchet by a hand wheel or disk that is attached to the end of the shaft, and presses or holds the driving-wheel up against the hub on the shaft, this hand disk or wheel serving not only this purpose, but also as a means by which the needle-shaft can by hand be rotated in a direction opposite to that in which it is revolved by the driving-wheel.

The nature of my improvements will be readily understood by reference to the accompanying drawing, in which—

Figure 1:
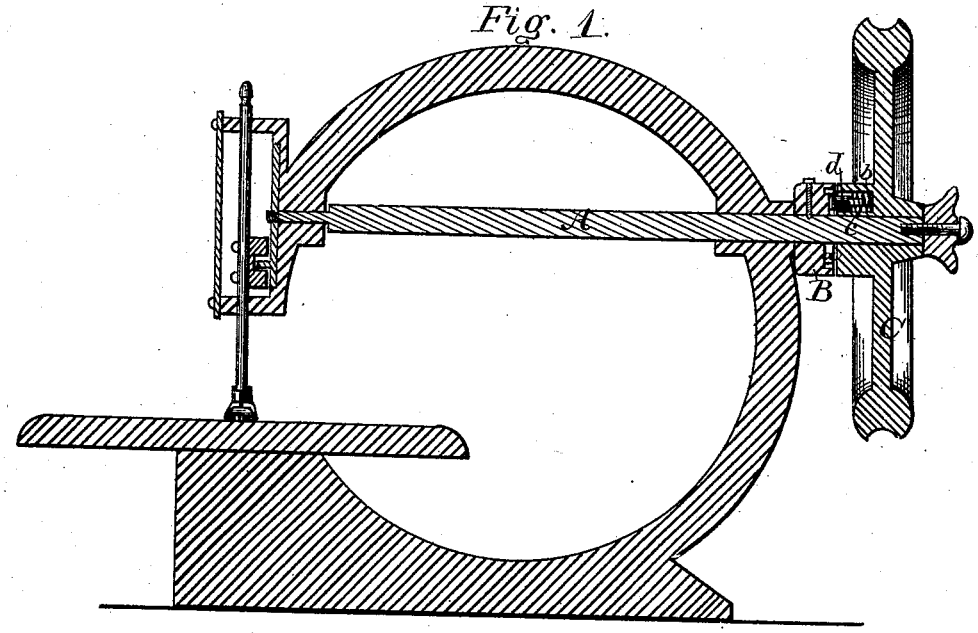
Figure 2:
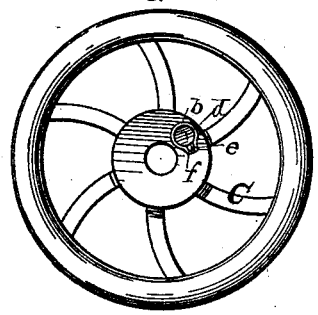
Figure 3:
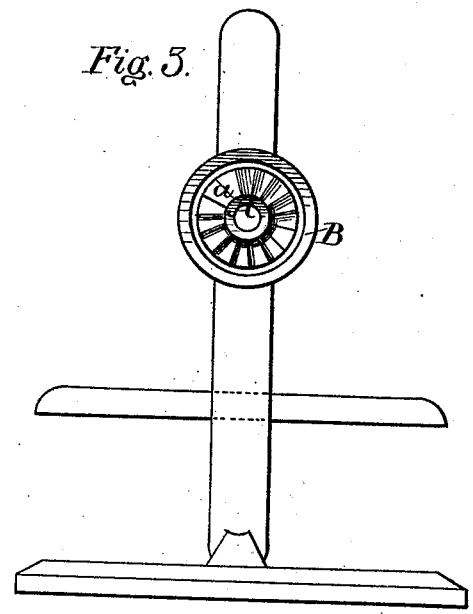

Figure 1 is a longitudinal vertical section of so much of a sewing-machine as needed to illustrate my invention, the plane of section passing through the axis of the needle-shaft. Fig. 2 is a view of the driving-wheel detached. Fig. 3 is a rear view of the machine with the driving-wheel removed, showing the face-ratchet on a hub fixed to the needle-shaft.

A is the revolving needle-shaft, which operates the needle-bar of the machine in any known or suitable manner. At its rear it carries a hub, B, fixed to it, and provided with a face-ratchet, $a$, as shown. Mounted loosely upon the shaft, back of the ratchet-hub, is a fly or driving wheel, C, which is driven by belting in the usual way, and is provided in that part of its hub contiguous to the ratchet $a$ with a socket, $b$, which contains a spring, $c$, and in front of the spring a cylindrical metal block, $d$, with an outer beveled face, which is pressed outwardly by the spring $c$, and constitutes a spring-pawl, which bears with a spring-pressure against the ratchet $a$, its inclined face corresponding in shape to and fitting into the teeth of the ratchet. When the wheel revolves in the proper direction, the pawl engages whatever ratchet-tooth it may be opposite to, and forces the shaft to revolve. When, however, the rotation of the wheel is reversed, the pawl will ride over the ratchet-teeth, and consequently the shaft will remain at rest. A spline, $e$, on the pawl-block $d$, engaging a groove, $f$, in the socket, assures the pawl in its proper position at all times.

Upon the end of the shaft A, back of the driving or fly wheel C, is a head or disk, D, which is detachably connected therewith, as shown. This device D is applied to the shaft after the fly-wheel is put on, and serves to force the latter up against the ratchet-hub B, and to hold the spring-pawl in engagement with the ratchet-teeth. It also is intended to be used for rotating the needle-shaft by hand in a direction opposite to that in which the shaft can be revolved by the driving-wheel.

I would remark that while I prefer the arrangement shown in the drawings, yet the position of the pawl and ratchet may be reversed—that is to say, the face-ratchet may be on the hub of the driving-wheel, and the spring-pawl in a socket in the hub on the shaft.

What I claim, and desire to secure by Letters Patent, is as follows:

The combination of the fly or driving wheel, the shaft, the face-ratchet, and spring-pawl contained in the contiguous parts of hubs on said wheel and shaft, respectively, and the head or hand wheel attached to the shaft serving at once to hold the pawl and ratchet in engagement, and as a means of rotating the shaft independently of the fly-wheel.

In testimony whereof I have hereunto set my hand this 9th day of December, A. D. 1878.

JAMES H. LA MENT.

Witnesses:
M. W. JONES,
E. D. VANHORN.